United States Patent
Fourney

(10) Patent No.: US 9,573,772 B2
(45) Date of Patent: Feb. 21, 2017

(54) CONVEYOR SYSTEM WITH ROLLER ASSEMBLIES

(71) Applicant: Laitram, L.L.C., Harahan, LA (US)

(72) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/942,301

(22) Filed: Nov. 16, 2015

(65) Prior Publication Data

US 2016/0159581 A1    Jun. 9, 2016

Related U.S. Application Data

(60) Provisional application No. 62/087,453, filed on Dec. 4, 2014.

(51) Int. Cl.
| | | |
|---|---|---|
| *B65G 47/10* | (2006.01) | |
| *B65G 47/54* | (2006.01) | |
| *B65G 15/50* | (2006.01) | |
| *B65G 39/12* | (2006.01) | |
| *B65G 47/22* | (2006.01) | |
| *B65G 15/10* | (2006.01) | |

(52) U.S. Cl.
CPC .............. *B65G 47/54* (2013.01); *B65G 15/105* (2013.01); *B65G 15/50* (2013.01); *B65G 39/12* (2013.01); *B65G 47/22* (2013.01); *B65G 2811/0657* (2013.01); *B65G 2811/098* (2013.01)

(58) Field of Classification Search
CPC ....... B65G 17/24; B65G 17/345; B65G 15/50; B65G 47/54; B65G 2207/18
USPC ............ 198/370.06, 370.09, 371.3
See application file for complete search history.

(56) References Cited

U.S. PATENT DOCUMENTS

| | | | | |
|---|---|---|---|---|
| 4,696,386 A | | 9/1987 | Lem | |
| 4,962,841 A | * | 10/1990 | Kloosterhouse ....... | B65G 47/54 198/370.09 |
| 6,223,880 B1 | * | 5/2001 | Caspi ..................... | B23Q 1/032 198/346.2 |
| 6,343,685 B1 | * | 2/2002 | Hofer ..................... | B65G 47/71 198/370.09 |
| 6,494,312 B2 | | 12/2002 | Costanzo | |
| 6,533,100 B2 | * | 3/2003 | Wheeler ................ | B65G 43/08 198/370.09 |
| 6,968,941 B2 | | 11/2005 | Fourney | |

(Continued)

FOREIGN PATENT DOCUMENTS

| | | |
|---|---|---|
| EP | 0957049 A1 | 11/1999 |
| JP | 05-085725 U | 11/1993 |

OTHER PUBLICATIONS

International Search Report and Written Opinion of the International Searching Authority, PCT/US2015/060884, mailed Mar. 11, 2016, Korean Intellectual Property Office, Daejeon, Republic of Korea.

*Primary Examiner* — James R Bidwell
(74) *Attorney, Agent, or Firm* — Catherine M. Bishop

(57) ABSTRACT

A conveyance device comprises a sorting plate housing a plurality of roller assemblies and a series of narrow conveyor belts for conveying articles towards the sorting plate. In a first mode, the narrow conveyor belts bypass the roller assemblies and convey articles over the sorting plate. In a second mode, the conveyor belts bring an article into contact with the roller assemblies, which then manipulate the trajectory of the article.

16 Claims, 4 Drawing Sheets

(56) References Cited

U.S. PATENT DOCUMENTS

| | | | |
|---|---|---|---|
| 7,237,670 B1 * | 7/2007 | Ryan | B65G 17/24 198/370.09 |
| 7,588,137 B2 | 9/2009 | Fourney | |
| 7,631,744 B2 * | 12/2009 | Brommer | B42C 19/08 198/370.09 |
| 7,681,710 B2 * | 3/2010 | Kuhn | B65G 47/54 198/370.06 |
| 8,360,227 B2 * | 1/2013 | Niewiera | B65G 49/064 198/347.1 |
| 8,684,169 B2 * | 4/2014 | Itoh | B65G 13/075 198/370.06 |
| 8,978,879 B2 | 3/2015 | Fourney | |
| 2003/0111320 A1 * | 6/2003 | van Leeuwen | B65G 15/105 198/370.06 |
| 2007/0284218 A1 | 12/2007 | Wallace et al. | |
| 2014/0041989 A1 | 2/2014 | Wallace | |

\* cited by examiner

CONVEYOR SYSTEM WITH ROLLER ASSEMBLIES

RELATED APPLICATION

The present application claims priority to U.S. Provisional Patent Application No. 62/087,453, filed Dec. 4, 2014 and entitled "Conveyor System with Roller Assemblies", the contents of which are herein incorporated by reference.

BACKGROUND OF THE INVENTION

The invention relates generally to power-driven conveyors and more particularly to conveyors having rollers for manipulating the trajectory of articles through a conveyor system.

Many package- and material-handling applications require that conveyed articles be diverted to a side of a conveyor. Two examples are sorting articles off the side of a belt and registering articles against the side of the belt. U.S. Pat. No. 6,494,312, "Modular Roller-Top Conveyor Belt with Obliquely-Arranged Rollers," Dec. 17, 2002, to Costanzo discloses a conveyor system in which cylindrical rollers mounted in a conveyor belt on axles oblique to the direction of belt travel are actuated by underlying bearing surfaces on which the oblique rollers ride as the belt advances in the direction of belt travel. The contact between the rollers and the bearing surfaces causes the rollers to rotate as the belt advances. The rotation of the oblique rollers pushes articles atop the rollers across the conveyor belt toward a side of the conveyor. These oblique-roller belts work extremely well on planar bearing surfaces as long as the rollers are arranged to rotate at an angle between the direction of belt travel (defined as a roller angle of 0°) and about 30° or so from the direction of belt travel. For roller angles greater than 30°, the rollers slip too much on the planar bearing surfaces.

U.S. Pat. No. 6,968,941, "Apparatus and Methods for Conveying Objects," Nov. 29, 2005, to Fourney describes an improved bearing surface that accommodates a much greater range of roller angles. Instead of using a planar bearing surface, Fourney uses the outer peripheries of actuating rollers arranged to rotate on axes in the direction of belt travel. As the conveyor belt advances, the oblique belt rollers roll on the underlying actuating rollers, which are also caused to roll on their axes. Because the bearing surface on the periphery is rolling, slip is reduced and greater roller angles can be accommodated. The greater roller angles permit much sharper article-diversion trajectories than are possible with a planar bearing surface. But actuating rollers are more expensive and slightly more complicated than simple planar bearing surfaces.

U.S. Pat. No. 7,588,137, "Conveyor Belt Having Rollers that Displace Objects," Sep. 15, 2009, to Fourney describes a conveyor belt that includes multiple roller sets used to divert objects from the conveyor belt. The angles along which articles can be diverted from the conveyor are limited.

U.S. Patent Publication 2013/0192954, published Aug. 1, 2013 and entitled "Multi-Directional Roller Assembly" (now U.S. Pat. No. 8,978,879), the contents of which are herein incorporated by reference, describes a multi-directional roller assembly that may be driven by a conveyor belt below the assembly. The same conveyor belt conveys articles to and from a roller plate housing an array of multi-directional roller assemblies. The roller assemblies manipulate the trajectory of the articles, or pass the articles straight along the roller plate and back onto the conveyor belt. The conveyor belt is diverted below the roller plate to drive the roller assemblies. The conveyor belt may experience high tensions. Furthermore, the transition of articles off the conveyor belt, onto the roller plate and back onto the conveyor belt may alter the desired spacing between articles, in addition to presenting unnecessary instability.

SUMMARY OF THE INVENTION

A conveyor system employs a roller plate housing an array of roller assemblies for manipulating the trajectory of an article and a series of narrow conveyor belts passing over the top of the roller plate between roller assemblies and back under the roller plate. The narrow conveyor belts are movable relative to the top surface of the roller plate. In a raised mode, the narrow conveyor belts convey articles over the roller plate. In a lowered mode, the narrow conveyor belts pass articles onto the roller plate and into contact with the roller assemblies, which manipulate the trajectory of the articles. Below the roller plate, the narrow conveyor belts in the returnway may help drive the roller assemblies.

According to a first aspect, a conveyance device comprises a sorting plate having an array of roller assemblies for contacting and directing an article of conveyance along a selected trajectory, at least one conveyor belt passing between two roller assemblies and an actuator for selectively raising and lowering the conveyor belt relative to the sorting plate.

According to another aspect, a conveyance device comprises a sorting plate having a plurality of rows of roller assemblies for contacting and directing an article of conveyance along a selected trajectory, a plurality of tracks passing between roller assemblies, a plurality of narrow conveyor belts contained in the tracks, and an actuator for varying the distance between the narrow conveyor belts and the roller assemblies.

According to another aspect, a method of sorting articles comprises the steps of conveying articles towards a sorting plate having a plurality of roller assemblies using a series of narrow conveyor belts and adjusting a distance between the roller assemblies and the narrow conveyor belts depending on an orientation of the roller assemblies.

BRIEF DESCRIPTION OF THE DRAWINGS

These aspects and features of the invention, as well as its advantages, are explained in more detail in the following description, appended claims, and accompanying drawings, in which:

DETAILED DESCRIPTION OF THE INVENTION

A conveyor system includes an array of roller assemblies and a plurality of narrow conveyor belts passing over the roller plate between the roller assemblies. The invention will be described below relative to certain illustrative embodiments, though one skilled in the art will recognize that the invention is not limited to the illustrative embodiments.

Figure 1:
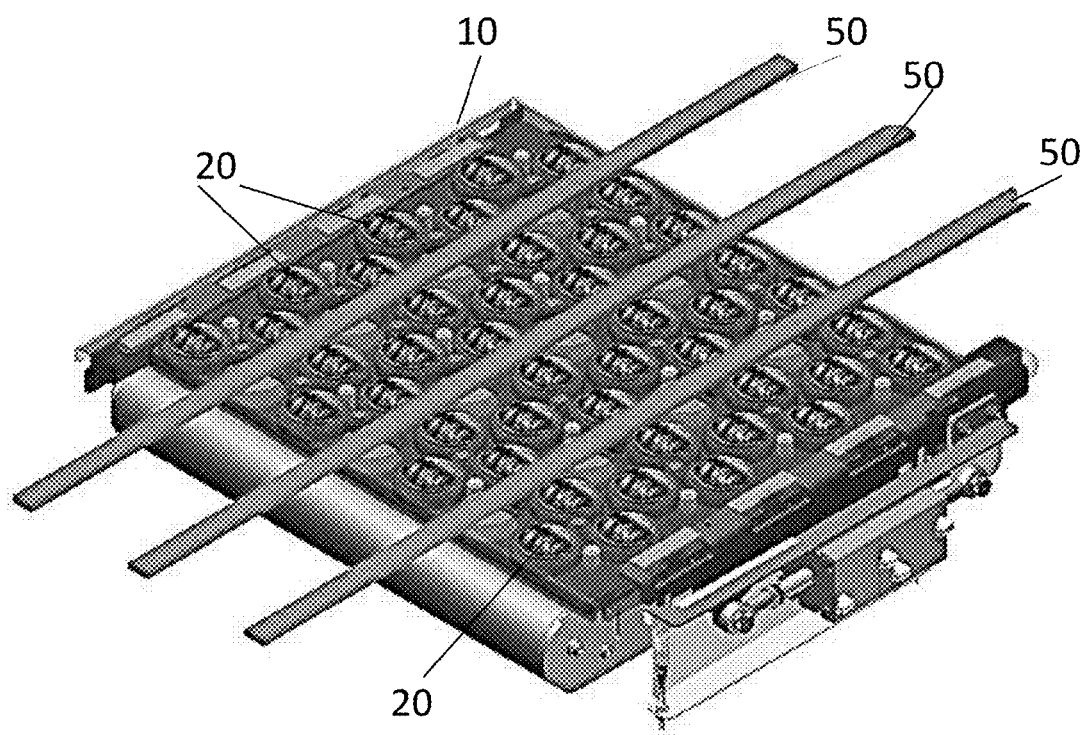
FIG. 1 is an isometric view of a sorting plate with a series of narrow belts passing between roller assemblies according to an embodiment of an invention.

FIG. 1 shows a conveyor system including a sorting plate 10 that comprises a plurality of roller assemblies 20 for selectively changing the trajectory of a conveyed article. The roller assemblies 20 are arranged in a pattern of alternating rows, though the sorting plate 10 may have any suitable number, size, configuration and arrangement of roller assemblies. The roller assemblies 20 are housed between upper and lower plates, as described in U.S. Patent Publication 2013/0192954, published Aug. 1, 2013 and entitled "Multi-Directional Roller Assembly", the contents of which are incorporated herein by reference, though the invention is not limited to the multi-directional roller assemblies there described.

The sorting plate 10 includes a plurality of narrow conveyor belts 50. The belts 50 operate in at least two modes: a raised mode and a lowered mode. In one embodiment, an actuator selectively raises or lowers the drive belts relative to the sorting plate 10 to switch between modes. In a raised mode, one or more of the drive belts is raised above the top surface of the sorting plate 10, so that a product carried towards the sorting plate by the drive belts will pass over the sorting plate without contact with the roller assemblies 20. In the raised mode, the belts 50 serve as the primary conveyor of articles over the sorting plate 10. In a lowered mode, an actuator lowers the conveyor belts 50 relative to the top surface of the sorting plate, so that an article conveyed to the sorting plate 10 by the belts 50 contacts the roller assemblies 20 which then direct the article in a selected direction, depending on the orientation of the roller assemblies. In one embodiment, the belts 50 return under the sorting plates and also serve as drivers for the roller assemblies 20. As show, the narrow conveyor belts 50 have a width sufficiently narrow to allow passage of the conveyor belt between adjacent roller assemblies 20 in the sorting plate 10.

The individual roller assemblies 20 are arranged to allow clear passage of the narrow belts in either situation in either mode. The roller plate 10 may include tracks between different roller assemblies for containing the belts 50. The tracks keep the belts in a straight orientation relative to the motion and support the weight of the belts and conveyed articles. In one embodiment, an actuator selectively moves the tracks up and down to expose the conveyed articles to the roller assemblies 20. In another embodiment, the conveyor belts 50 can remain vertically stationary while the roller assemblies 20 move up and down to alternate between the two modes.

In one embodiment, the actuator moves only the top (carryway) portion of the belts 50 between raised and lowered positions. In another embodiment, the actuator moves an entire belt 50 or series of belts 50, or the roller plate 10 may be moved relative to the top portion of the belts 50. The tracks or the belts 50 or the roller assemblies 20 or the roller plate 10 may be raised and lowered independently of the actual roller assemblies using cams, motors, air cylinders, hydraulic cylinders, magnets, springs or any suitable combination of actuators.

Figure 2:
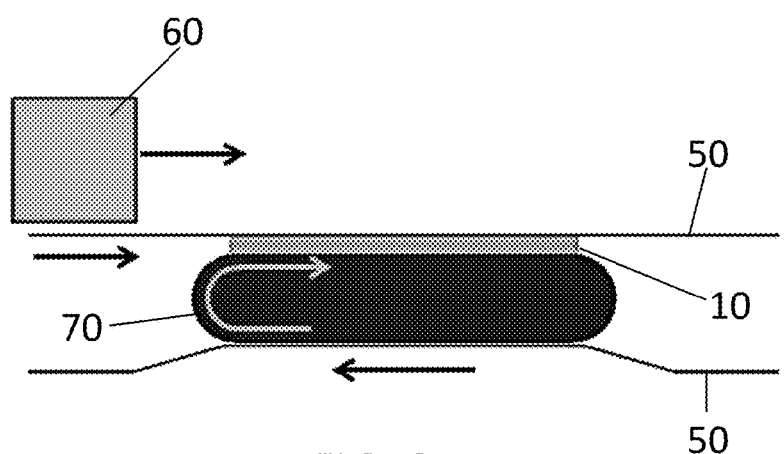
FIG. 2 is a schematic side view of a conveying system including a sorting plate, narrow belts and secondary drive belt below the sorting plate.

FIG. 2 is a schematic side view of the conveying system of FIG. 1. The narrow belts 50 convey an article 60 towards the sorting plate 10. In a raised mode, the narrow belts 50 convey the article at belt speed over the sorting plate 10. In a lowered mode, the narrow belts 50 convey the article to the sorting surface of the sorting plate 10, where the roller assemblies act on the package. The narrow belts 50 return below the sorting plate 10. The narrow belts may engage a secondary belt 70 below the sorting plate 10 to drive the roller assemblies 20. Alternatively, a motor or other suitable driver may be used to drive the roller assemblies 20.

Figure 3A:
FIG. 3A is a side view of a sorting plate with narrow belts in a raised mode according to an embodiment of the invention.

FIG. 3A is a side view of the sorting plate 10 with the narrow belts 50 raised relative to the top surface of the roller plate 10. In a raised mode, the top surface of the narrow belts 50 remains the conveying surface for conveyed articles. The conveyed article does not contact the roller assemblies as it passes over the sorting plate 10.

Figure 3B:
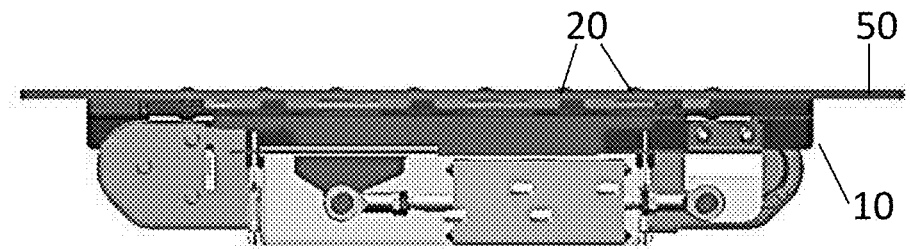
FIG. 3B is a side view of a sorting plate with narrow belts in a lowered mode according to an embodiment of the invention.

FIG. 3B is a side view of the sorting plate 10 with the narrow belts 50 lowered relative to the top surface of the sorting plate 10. In the lowered mode, the top surface of the belts 50 is even with or below the tops of the roller assemblies, so that the roller assemblies 20 contact the conveyed article. Each roller assembly 20 is selectively oriented and actuated to manipulate the trajectory of a conveyed article.

Any suitable means for raising and lowering the belts 50 may be used. In one embodiment, the vertical motion of the belt 50 over the roller plate 10 may be connected to the orientation of the roller assemblies 20 within the plate.

Figure 4A:
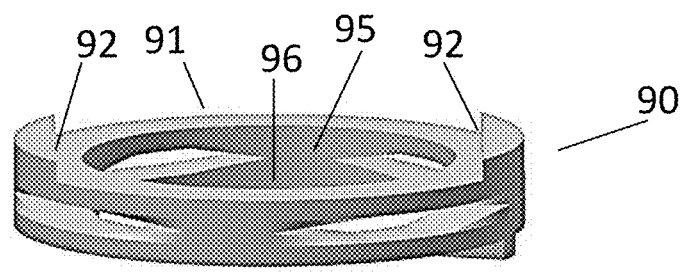
FIG. 4A is an isometric view of a rotational ramp for positioning a narrow belt in a first position.
Figure 4B:
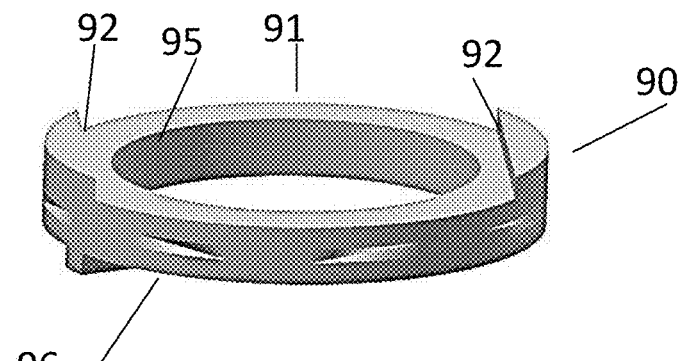
FIG. 4B is an isometric view of a rotational ramp for positioning a narrow belt in a second position.

For example, FIGS. 4A and 4B show a rotational ramp 90 for guiding and changing the height of a belt 50 across a roller plate 10. The rotational ramp 90 forms a track 91 with walls 92 for guiding a narrow conveyor belt over or through a roller plate. The rotational ramp 90 is designed so that the track 91 is in a high position (FIG. 4A) when the roller assemblies are in a pass-through position, so that the roller assemblies do not contact the conveyed article. When the roller assemblies are oriented in a sorting orientation, the track 91 is in a lower position (FIG. 4B) to lower the conveyor belt 50 passing through the track 91, allowing an article conveyed by the conveyor belt 50 to contact the roller assemblies. The rotational ramp comprises a top portion 95, which is fixed to the narrow belt track and a bottom portion 96, which rotates with the roller assemblies or connected gearing. The bottom portion and top portion including bearing surfaces, such that rotation of the bottom portion 96 relative to the top portion 95 pushes the top portion 95 up to raise the track 91.

Figure 5:
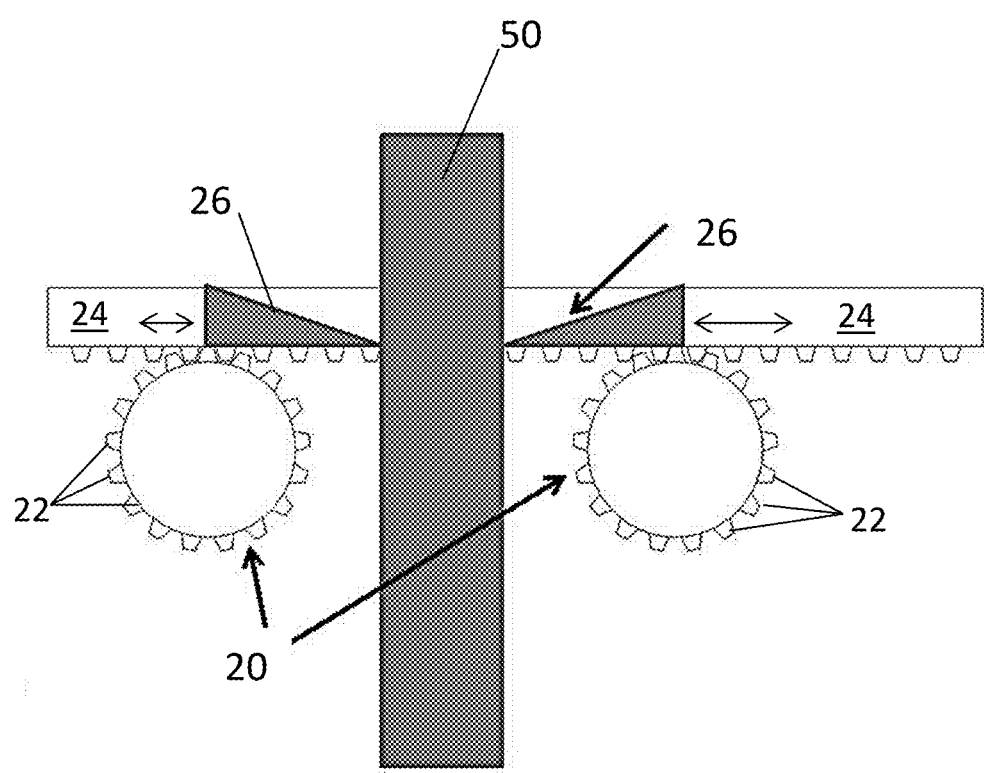
FIG. 5 is a schematic view of a portion of a roller plate including a narrow belt passing between roller assemblies and having ramps on a rack gear for selectively raising and lowering the narrow belt according to another embodiment of the invention.

FIG. 5 is a schematic overhead view of a belt 50 passing through a pair of roller assemblies 20 according to another embodiment of the invention. In the embodiment of FIG. 5, each roller assembly 20 includes peripheral teeth 22 that engage a rack gear 24 or other actuator to selectively orient the roller assemblies 20. The rack 24 includes ramps 26 for selectively raising and lowering the belt 50 relative to the roller assemblies 20, depending on the orientation of the roller assemblies. When the roller assemblies are oriented in a pass-through orientation, the ramps 26 move inwards to push the belt 50 up so that the roller assemblies do not contact the conveyed article. When the rollers assemblies 20 are oriented in a sorting orientation, the ramps 26 pull away from the belt to lower the belt 50.

Both the rotational ramp 90 shown in FIGS. 4A and 4B and the linear ramp 26 mechanisms can serve the dual purpose of transferring motion from one roller assembly 20 to another while also raising and lowering the belt 50 or a track containing the belt.

The narrow conveyor belts 50 allow a continuous conveying surface to be maintained. Since the belts 50 follow a much straighter path, the belt tension, belt wear and consumed power is reduced.

As these few examples suggest, the scope of the invention is meant to be defined by the claims and not limited to the details of the described versions.

What is claimed is:

1. A conveyance device, comprising:
   a sorting plate having an array of roller assemblies for contacting and directing an article of conveyance along a selected trajectory;
   at least one conveyor belt passing between two roller assemblies; and
   an actuator comprising a movable ramp for selectively raising and lowering the conveyor belt relative to the sorting plate.

2. The conveyance device of claim 1, further comprising a track for guiding the conveyor belt.

3. The conveyance device of claim 1, wherein the conveyor belt returns below the sorting plate.

4. The conveyance device of claim 1, wherein the conveyor belt selectively actuates at least one roller assembly from below the sorting plate.

5. The conveyance device of claim 1, wherein the actuator changes the position of the conveyor belt depending on an orientation of at least one roller assembly.

6. The conveyance device of claim 1, wherein the ramp is connected to a rack gear.

7. The conveyance device of claim 1, wherein the actuator comprises a rotational ramp.

8. A conveyance device, comprising:
   a sorting plate having a plurality of rows of roller assemblies for contacting and directing an article of conveyance along a selected trajectory;
   a plurality of tracks passing between roller assemblies;
   a plurality of narrow conveyor belts contained in the tracks; and
   an actuator comprising a movable ramp for varying the distance between the narrow conveyor belts and the roller assemblies.

9. The conveyance device of claim 8, wherein the actuator varies the distance based on an orientation of at least one roller assembly.

10. The conveyance device of claim 8, further comprising a secondary conveyor belt below the sorting plate for actuating the roller assemblies.

11. The conveyance device of claim 10, wherein at least one narrow conveyor belt contacts the secondary conveyor belt in the returnway of the narrow conveyor belt to actuate the secondary conveyor belt.

12. The conveyance device of claim 10, wherein the secondary conveyor belt actuates the roller assemblies.

13. The conveyance device of claim 8, wherein the actuator raises the narrow conveyor belts above the roller assemblies when the roller assemblies are in a first position and lowers the narrow conveyor belts below the tops of the roller assemblies when the roller assemblies are in a second position.

14. A method of sorting articles, comprising the steps of:
   conveying articles towards a sorting plate having a plurality of roller assemblies using a series of narrow conveyor belt connected to movable ramps; and
   moving the movable ramps to adjust a distance between the roller assemblies and the narrow conveyor belts depending on an orientation of the roller assemblies.

15. The method of claim 14, wherein the step of adjusting comprises raising the narrow conveyor belts above the roller assemblies if the roller assemblies are in a pass-through orientation.

16. The method of claim 14, wherein the step of adjusting comprises lowering the narrow conveyor belts below the tops of the roller assemblies if the roller assemblies are in a sorting orientation.

\* \* \* \* \*